(12) United States Patent
Houldsworth

(10) Patent No.: US 7,917,921 B2
(45) Date of Patent: Mar. 29, 2011

(54) CONTROL OF AN INTERACTIVE APPLICATION

(75) Inventor: Richard J. Houldsworth, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 3141 days.

(21) Appl. No.: 10/218,364

(22) Filed: Aug. 14, 2002

(65) Prior Publication Data

US 2003/0070165 A1    Apr. 10, 2003

(30) Foreign Application Priority Data

Sep. 19, 2001  (GB) .................................. 0122585.3
Jun. 25, 2002  (GB) .................................. 0214735.3

(51) Int. Cl.
*H04N 7/10* (2006.01)
(52) U.S. Cl. .............................. 725/25; 725/37; 725/136
(58) Field of Classification Search .................... 725/25, 725/37, 39, 100, 110, 131, 139, 135; 348/460
See application file for complete search history.

(56) References Cited

U.S. PATENT DOCUMENTS

| 4,580,285 | A  | * | 4/1986 | Richards, Jr. ............. 455/161.3 |
| 6,668,158 | B1 | * | 12/2003 | Tsutsui et al. ............ 455/12.1 |
| 7,069,571 | B1 | * | 6/2006 | Del Sesto et al. ............ 725/14 |
| 2002/0091816 | A1 | * | 7/2002 | Stalker ........................ 709/224 |
| 2002/0106018 | A1 | * | 8/2002 | D'Luna et al. ........... 375/240.01 |

FOREIGN PATENT DOCUMENTS

EP            0975175 A2       1/2000

* cited by examiner

*Primary Examiner* — Brian T Pendleton
*Assistant Examiner* — Jason K Lin

(57) ABSTRACT

A method for controlling an interactive application comprises receiving a data stream comprising an interactive application and monitoring the data stream to identify a change in the stream. In response to the change, the method further comprises preventing the interactive application from accessing files, identifying those files present in the data stream, and enabling the interactive application to access only those files present in the data stream.

15 Claims, 2 Drawing Sheets

CONTROL OF AN INTERACTIVE APPLICATION

Figure 1:
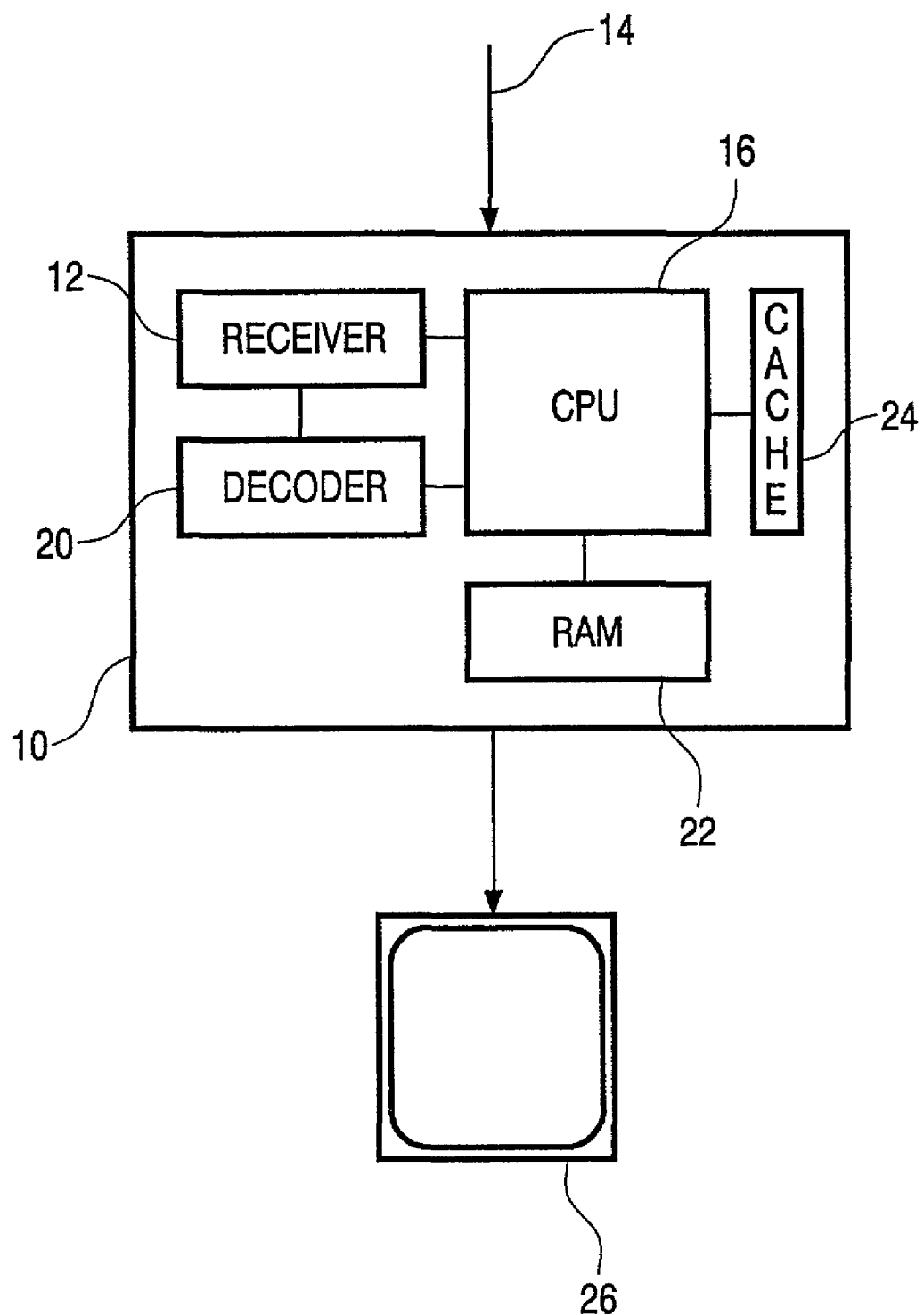

This invention relates to a method and apparatus for controlling an interactive application. In particular, but not exclusively, the apparatus is an integrated circuit forming part of a digital television receiver.

A digital receiver receives a digital broadcast signal that typically comprises video, audio and data components. The data component is provided in a repetitive "carousel" type manner, with modules being downloaded by the receiver as and when they are required. The modules typically contain interactive applications written in the JAVA programming script.

If a user wishes to access an interactive application through the digital receiver, then this functionality is available via a user interface, typically a remote control. These interactive applications are such things as electronic program guides, "teletext" type information, and applications that relate to the subject matter being broadcast. This latter type of application would be, for example if the user was watching coverage of a golf tournament, detailed diagrams of each hole of the course, statistics on, the golfers participating, a real time leaderboard, etc. Applications that involve two-way communication are also possible, for example shopping and betting. The digital receiver is provided with a back channel, normally via the telephone network to facilitate this two-way communication.

However, the software for running these interactive applications is delivered to the digital receiver via the data component of the broadcast signal. The JAVA applets that make up the interactive applications are dedicated to each broadcast channel and are broadcast repetitively by the transmitter in a carousel form. Once a user selects an interactive application, the set top box must begin acquiring the necessary JAVA applets to be able to execute the application.

If there is any change in the data stream, for example, when the user changes channel, then the digital receiver needs to be able to adapt to the new circumstance of a new data stream. Current digital receivers either abandon the presently running interactive application, or the interactive application will crash once it requires files that are not present in the data stream. Neither of these results delivers satisfactory operation for the user of the digital television receiver.

It is therefore an object of the invention to improve upon the known art.

According to a first aspect of the invention, there is provided a method for controlling an interactive application, comprising receiving a data stream comprising an interactive application, monitoring said data stream to identify a change in said stream and in response to said change, preventing said interactive application from accessing files, identifying files present in said data stream, and enabling said interactive application to access only those files present in said data stream.

According to a second aspect of the invention, there is provided apparatus for controlling an interactive application, comprising receiving means for receiving a data stream comprising an interactive application, monitoring means for monitoring said data stream and for controlling said interactive application to prevent the interactive application from accessing files following a change in the data stream, to identify files present in the data stream and to enable said interactive application to access only those files present in said data stream.

The method can be achieved by a computer program element, installed on suitable hardware or stored on a record carrier. The apparatus can be comprised of an integrated circuit.

Owing to the invention, it is possible to control an interactive application so that following a change in the data stream carrying the interactive application, the interactive application will continue to run as best as able from the files available to it. The change in the data stream may be caused, for example, by a break in the broadcast of data or by a user changing channels on the receiver of the data stream. If the interactive application requires a file that is not present in the data stream, rather than failing immediately because the file is not present, the interactive application "blocks" waiting for the file to arrive. The program thread that is making the request does not continue execution until the file becomes present again, or it is determined that the file is permanently unavailable. However, other program threads continue to execute.

Figure 2:
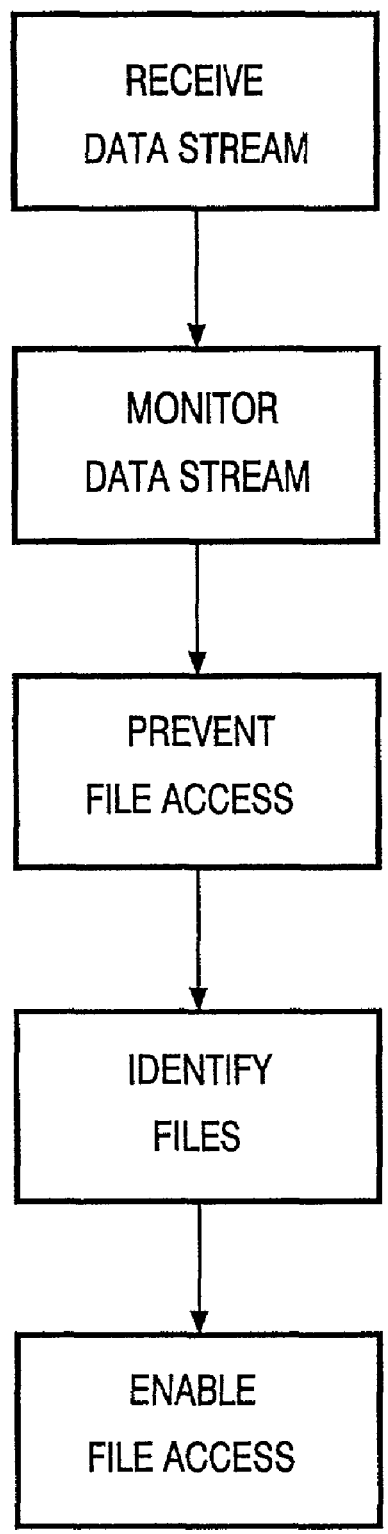

Embodiments of the invention will now be described, by way of example only, with reference to the accompanying drawings, in which:

FIG. 1 is a schematic diagram of a set top box connected to a display device, and FIG. 2 is a flow diagram of a method for controlling an interactive application.

In FIG. 1, the set top box 10 comprises receiving means, in the form of a receiver 12 for receiving a digital broadcast signal 14. The set top box also comprises processing means, in the form of a CPU 16, for processing the signal 14. The set top box additionally includes components such as a decoder 20, a RAM 22 and a cache memory 24. The decoder 20 demultiplexes the broadcast signal 14. The video component is passed to the display device 26, and the audio component is passed to audio speakers (not shown). A user of the set top box 10 selects, via a suitable user interface, the channel that they wish to watch, and the appropriate content is acquired and provided to the user.

The signal 14 includes within it a data stream comprising an interactive application. The data stream may comprise multiple interactive applications, as desired. The apparatus for controlling the interactive application comprises receiving means 12 for receiving the data stream comprising the interactive application, and the CPU 16, acting as monitoring means for monitoring the data stream. The apparatus typically comprises an integrated circuit, forming part of the digital television receiver 10.

A technique to maintain access to broadcast data carousel services when changing current service is required. Digital TV systems include mechanisms for the broadcast of generic data via carousel delivery. An important example is the DVB Object Carousel defined for the DVB digital TV standards. These mechanisms are becoming more important as they underlie the new generation of interactive services, including MHEG-5, DVB MHP and OCAP. In these systems, the data broadcast includes one or more broadcast file-systems, where the components of the file-systems are transmitted to the receiver 10 in a carousel (i.e. repeated) fashion. The receiver 10 attempts to recover the file-system contents by analysing the incoming data stream. The file-system will contain executable code and assets for one or more applications associated with the service being presented to the user.

In systems such as MHP, it is possible that an application is allowed to run within more than one service. For example, an Electronic Program Guide for a bouquet of services from one service provider will continue executing when the user switches between services of the bouquet. However, as the carousel data is connected to the original service used, currently this data becomes inaccessible once a new service is selected. This places severe restrictions on the capabilities of the application, and most applications will not be able to recover from this sudden removal of access.

A mechanism for seamless handing-over of carousel access from one service to another is therefore required. The goal is that the application should not be aware of the change in routing to the carousel data.

At the present time, DVB specifies a method of carrying a hierarchical file system within a DVB Transport Stream. This is used for data broadcasting. It can be used for carrying any data of the sort that would normally be stored in a computer file system. It is frequently used for carrying data files for interactive broadcast systems. For instance it is the chosen method for broadcasting MHEG-5 objects in the UK terrestrial implementation of DVB and it is used for Java class files and their associated data in the MHP specification from DVB. The system has been designed to provide a solution to the problem of efficient transport over a serial connection of a hierarchical file system. It can be parsed and the hierarchical directory structure, file names, and the content of the files can be recovered in the receiver. Carousel file-systems are transmitted as part of a 'service', where a service is defined as a set of elementary streams of various types which are intended to be presented to the user as a whole. The concept of a television programme is an example of a service containing audio and video streams. Carousel data may be transmitted once in a transport stream but be a part of more than one service within the transport stream. However, the carousel is logically considered to be a separate entity in each of the services its data is contained within.

The carousel decoder (located within the CPU 16) has two distinct parts:

1. A stream reader. Decodes data from the streams of the current service into a useable format. Typically, this part stores requested data 'modules' in a 'module cache' in the receiver's memory, and 2. A file-system driver. Receives requests from the applications running on the receiver, and attempts to find the requested data in the module cache, or passes on a fetch request to the stream reader.

Memory on the receiver 10 is normally limited, so it is not feasible to read in the complete carousel into memory. Therefore, a caching strategy is normally applied to try and ensure that the modules most likely to be requested are cached. This has a great effect on application performance, because fetch latencies from the broadcast carousel are normally many seconds.

Applications running on the receiver may wish to access data from a carousel on one service whilst simultaneously decoding a separate service. An example is non-service-bound MHP applications. These applications start in one service and use the carousel on that service, but may then cause the decoder to switch to another service. In these situations, the stream reader part of the decoder becomes inoperable because the data sources on the old service are no longer available. This severely impairs the operation of the application, and in most cases the application cannot be guaranteed to continue working without error. However, in many cases the new service will contain the same carousel data as the initial service, so there actually is a possible data source. This invention proposes a method by which the stream reader part of the decoder can remain operational after a service change, by identifying if there is an equivalent data source for the carousel, and thus ensure acceptable application operation.

This invention focuses on the DSMCC Object Carousel family of mechanisms, and its use within MHP, but the inventive ideas apply to any carousel-based data broadcast mechanism that presents the same data within several different services or programmes.

The option presented here is to compare the current service with the initial service where the carousel was mounted, and make a best effort to keep attached to the data streams that are common to both services. Note that this solution is helpful only where there is genuine sharing of data streams between services. If there is no overlap at all, the carousel remains 'lost'. However, this new option allows the broadcaster to optimise the broadcast for those applications that make use of these features. Two embodiments are discussed here. They address the issue of identifying which data items can be shared between services at two different levels.

In both embodiments the CPU 16 controls the interactive application to prevent the interactive application from accessing files following a change in the data stream (such as caused by a change in channel by a user). The CPU 16 identifies the files present in the data stream and enables the interactive application to access only those files present in the data stream. This method is illustrated in FIG. 2.

Embodiment 1: Carousel-level Sharing

A first embodiment views the carousel decoder as a server running on the device which is being updated from the stream. The server provides filesystem access for applications running on the devices, and has two running modes—in both the decoder provides the latest data it has, but only in one mode is the decoder receiving updates from the stream. Switching between services causes transitions between these modes. The carousel can only enter the fully running state when the service contains the complete carousel data source. The carousel has a number of specific states, and these are listed below with a definition.

attached: Filesystem mount point created. DSI PID logged. Carousel is not attached to a PMT/Service. No filesystem access.

started: attach PMT to carousel. Module/DSI/DII acquisition for normal operation started. New filesystem requests can be serviced. The Locator for the Service-Domain is set at this point.

stopped: module acquisition by section filtering stopped. Current state of filesystem maintained in memory, subject to caching effects. If modules are shared with another still running carousel, these will continue to be updated.

detached: carousel detached from service. All cached elements released. All file handles rendered invalid.

In an MHP environment, application signalling will trigger the initial transition to the started state, via attached. Termination of the application will move the carousel to the detached state. Changing away from a service moves the carousels on that service to the stopped state. Any of the events listed in B.2.9 also move a carousel to this state (i.e. this is equivalent to 'lost'). On reaching a new service, the PMT is examined. The algorithms described below are used to determine if the module data from the initial service can be reused within the new service. If a match is found, the carousel is moved back into started state, and the carousel resumes operation in the new service. These transitions are invisible to the application. If no match is found, the carousel remains in the stopped state. Attempts to recover a carousel lost for other reasons can occur in a platform-dependent way. Most of the reasons for the original loss are fairly terminal, so such a carousel is a good candidate for forced detachment.

As currently stated, a stopped carousel may be moved to the detached state by the system. This should occur for boot carousels once the Xlet has been destroyed, and as a last resort for running Xlets when the carousel decoder cannot recover memory in any other way. The system should attempt to purge unused items from the module cache first.

The algorithm chosen to determine equivalence of carousels depends on how the set of elementary streams potentially delivering carousel data is signalled:

1. Content bound by service. The set of carousel elementary streams used by the carousels in the service is only defined by the services' association tag table. In this model, either all or none of the carousels in the service remain available on a service change. All elementary streams with the DSMCC UN messaging type (11) should have identical descriptor loops and refer to the same PID as on the original service. Additional entries may be present if they were included in the deferred association tags of the original service. If the original service contains a deferred association tag descriptor, all entries referring to elementary streams must either be resolved in the elementary stream loop, or identically held in the deferred association tag descriptor, of the new service.

2. Content bound by the carousel. In this model, each carousel in a service can be analysed separately. The set of elementary streams used by each carousel is described at the top level of the carousel, for example, as a "manifest descriptor" in the DSI. All entries in this manifest would be resolved from association tag to elementary stream. On reaching the new service, the system checks whether the DSI contains additional information on the components of the carousel. The association tags of the DIIs of the carousel are listed in this 'manifest descriptor'. If this information is not present, then revert to the first method above. All entries in this list are resolved from association tags to PIDs on selection of the original service. If this 'manifest descriptor' is present, it is not valid for data in the carousel to reference any other association tags—the objects thus referenced should be appear to be unobtainable in the filesystem abstraction. On reaching the new service, the system checks whether the DSI is on the same PID as on the original service and then resolves all listed entries in the new PMT. If all match, according to the last sample from the PMT before leaving that service, this is enough to guarantee full equivalence. Note that the association tag-to-PID mapping may change over time, but this does not invalidate the current carousel cache. Hence the PID comparison should be done based on the latest available knowledge of the previous service.

Embodiment 2: Elementary Stream Level Sharing

A second embodiment (or refinement) is to allow a mixture of 'started' and 'stopped' modules in the carousel, in the situation where there is a mismatch in some association tags but not others. In this situation, only the modules with a matching source will continue to be updated from the stream.

The other entries will remain as they were before the transition. It is not permitted for data from the 'wrong' PIDs to enter the system. A way to implement this is to perform tag-PID translation via a lookup table. This table is established by the initial 'master' service for the carousel, filling in the association tag and Master PID columns of the table from the PMT. When operating in a different service, the entries in the PMT are mapped into a third 'Current PID' column of the table. On all attempts to update the modules, if there is a mismatch between Master and Current PIDs, the update fails. Also new acquisition requests fail on a mismatch.

For deferred association tags, the locator of the streams are compared rather than the PIDs directly. This avoids potentially slow PID lookup on each comparison—it is only resolved after a successful comparison. The PMT of the original service may continue to be monitored on the new service, to follow changes in PID.

With this model, there are no started and stopped states, only attached and detached. The Locator of the carousel does not change because it is still effectively running according to the original service, but accessing only the data available through the current service.

This invention permits preservation of carousel module data across service boundaries. Some Object Carousel formats support access to media streams (via Stream objects) and real-time event information (StreamEvents) as well as conventional filesystem file and directory objects. For these other content types, access is similarly enabled by analysis of the association tag mapping. Blocking access to these formats has the effect of preventing access to current stream data in a non-destructive way. For example, no video is displayed, but no error occurs.

Multiple object carousels may access the same data modules. It is assumed here that each object carousel only has one client. So, for example, if two applications access the same object carousel, there are actually two separate object carousel data structures. This allows the discounting of the case where one client of an object carousel wishes to transition to a new service, but the other client does not.

The invention is primarily applied in the field of digital TV broadcasts. This is the first area where widespread broadcast distribution of data via carousels occurs, and where there is a requirement to access this data from more than one 'service' (where service means a collection of data items processed as a whole). Of course, these mechanisms also apply in digital radio broadcasting, and indeed in pure data broadcasting networks.

From the present disclosure, many other modifications and variations will be apparent to persons skilled in the art. Such modifications and variations may involve other features which are already known in the art and which may be used instead of or in addition to features already disclosed herein.

The invention claimed is:

1. A method for controlling an interactive application, comprising:
   receiving a data stream that includes an interactive application,
   monitoring the data stream to identify a change in the stream, and
   in response to the change:
      preventing the interactive application from accessing files,
      identifying files present in the data stream, and
      enabling the interactive application to access only those files present in the data stream.

2. The method of claim 1, wherein the data stream is included in a broadcast signal.

3. The method of claim 1, wherein the method is executed by a computer program.

4. The method of claim 3, wherein the computer program is executed by a digital television receiver.

5. The method of claim 4, wherein the change occurs when the digital television receiver changes channel.

6. An apparatus for controlling an interactive application, comprising:
   receiving means for receiving a data stream comprising an interactive application, and
   monitoring means for monitoring the data stream and for controlling the interactive application:
      to prevent the interactive application from accessing files following a change in the data stream, to identify files present in the data stream, and
to enable the interactive application to access only those files present in the data stream.

7. The apparatus of claim 6, the apparatus is embodied in an integrated circuit.

8. The apparatus of claim 7, wherein the integrated circuit forms part of a digital television receiver.

9. A system comprising:
a receiver that is configured to receive a data stream that Includes an interactive application, and
a controller that is configured to:
monitor the data stream to detect a change in the data stream, and
when a change is detected:
identify files received from the data stream, and
enable the interactive application to access only the files received from the data stream.

10. The system of claim 9, wherein the data stream is included in a broadcast signal.

11. The system of claim 9, wherein the controller Includes a processor that is configured to execute a computer program to monitor the data stream and enable the interactive application.

12. The system of claim 11, wherein the processor is included in a digital television receiver.

13. The system of claim 12, wherein the change corresponds to a change of channel of the digital television receiver.

14. The system of claim 9, wherein the system is embodied in an integrated circuit.

15. The system of claim 14, wherein the integrated circuit forms part of a digital television receiver.

* * * * *